United States Patent Office 2,792,295
Patented May 14, 1957

2,792,295

HERBICIDAL GRANULAR PELLETS AND METHOD OF APPLYING THE SAME

Maurice M. Wright, New Plymouth, Taranaki, New Zealand

No Drawing. Application March 19, 1951, Serial No. 216,472

Claims priority, application New Zealand March 29, 1950

11 Claims. (Cl. 71—2.1)

For some time past the distribution of fertilizers and weedkillers from the air by aircraft has become of increasing importance particularly in the United States of America. Aerial distribution of such substances has many advantages which it is unnecessary to enumerate. In the case of weedkillers however such distribution is open to a major objection where they are of a nature that have a deleterious effect on plants, vegetation or the like. Particularly in the case of the hormone type of weedkillers such as come for instance from the chlorinated phenoxyacetic acid group (such as the sodium salts of 2,4-D, the amine salts of 2,4-D, 2,4-dichlorophenoxyacetic acid and its esters, 4-chloro-2-methyl-phenoxyacetic acid and its esters, and 2,4,5-trichloro-phenoxyacetic acid and its esters) it has been found that air drift of the fine particles has created a very serious problem, damage being occasioned to susceptible plants and vegetation far remote from the area being treated with the dust or spray in which forms application is made at present. So serious has been the result of this air drift that I understand that prohibitive regulations have been introduced in various states in the United States of America prohibiting the aerial application of hormone type weedkillers. Such aforesaid difficulties are of course not peculiar to the United States but are met with in many other countries including New Zealand. It may be remarked however that having regard to the known efficiency and cheapness of aerial distribution, the damage resulting from air drift is indeed serious to call for its prohibition or restriction thus compelling farmers to resort to older and more costly and inefficient methods of application. Apart from the aforesaid danger to other plants it is obvious that quite a substantial loss is occasioned when a quantity of the weedkiller is air borne from the area required to be treated.

From the foregoing, it will be obvious that an improved method of application of hormone type weed killers that would substantially overcome or minimize this major disadvantage must be of great importance and value to the whole community. As a result of extensive research and tests I have found a solution to the problem whereby it will now be possible to distribute some of the hormone type weedkillers from the air or under circumstances where air drift is possible with substantial elimination or minimizing of the difficultes aforesaid. It will of course be understood that no representation is made that such distribution could be effected under adverse conditions such as would obtain on windy days but it can be stated that under such conditions as would be prudent to distribute superphosphate from the air, the possibility of damage to susceptible plants or vegetation reasonably remote from the area under treatment is substantially eliminated or materially minimized.

A fundamental step in the solution of the problem lies in the fact that as a result of extensive researches I have found, most unexpectedly, that most of the hormone type weedkillers hereinbefore referred to do not lose their efficacy under the temperatures necessary to obtain granulation, provided that the temperatures employed are controlled or adjusted having regard to the hormone type weedkiller used. I have found that hormone type weedkillers such as the acids and salts of the chlorinated phenoxyacetic acid group hereinbefore mentioned are suitable; volatile esters of the hormone type weedkillers are not suitable as their efficacy is substantially lost by volatilization during the granulating process. If however the esters are of sufficiently low volatility to prevent their being materially driven off during the necessary granulating process they will be satisfactory. The hormone type weedkillers referred to in this paragraph (other than volatile esters) are hereinafter referred to as "hormone substances."

Such solution also depends on the following desiderata:

(I) The hormone substance must be incorporated with other material to form a pellet or the like of such weight and/or size that under normal operative conditions the dangers due to air drift are materially minimized.

(II) That during the course of manufacture of said pellets or the like the hormone substance must be intimately incorporated therewith so as to ensure that each pellet will carry an adequate and substantially the same quantity of said substance to ensure or assist in substantially even distribution of the hormone substance or the like over the area to be treated.

(III) That the material of which the pellet is formed and which constitutes the carrier medium for the hormone substance must be such that (a) it will on contact with the ground release the hormone substance within a reasonable time so that it will be capable of attacking the weeds or other undesired vegetation; and (b) that it will not be incompatible with the hormone substance or the like. A carrier medium having the foregoing attributes is hereinafter referred to as a suitable carrier medium. Such a carrier medium may be or contain fertilizer. For instance it may, as hereinafter explained be superphosphate in granular form. In other cases where the use of a fertilizer would be unnecessary or undesirable a suitable carrier medium may comprise for instance clay, gypsum, lime, chalk or the like.

(IV) That the temperature of the granulating process be controlled to avoid a heat materially prejudicial to the hormone substance.

It will be understood, however, that although the primary object of the present invention is to provide means for ensuring distribution of the hormone substances under circumstances where air drift is likely, the utility of pellets produced according to this invention is not limited to that particular object.

In one aspect of the invention, therefore, the invention consists in a new article of manufacture comprising a weedkilling or herbicidal pellet or the like adapted for aerial or the like distribution comprising a suitable carrier medium having a hormone substance intimately incorporated therewith in phytocidal proportions, said pellet being of such size that it will pass through a 10 mesh B. S. sieve and will be retained on an 80 mesh B. S. sieve. (B. S. refers to British Standard industrial screen, usually abbreviated B. S. sieve, and is found in standard British specifications as British Standard No. 481 entitled, "Sieves and Screens for Industrial Purposes." As an industrial specification it is often abbreviated 431:1933).

In another aspect the invention consists in a method of producing herbicidal or weedkilling pellets or the like adapted for aerial or the like distribution, such method comprising, during the course of manufacture of the pellets, intimately incorporating a hormone substance in phytocidal proportions with a suitable carrier medium, and then, by granulating and screening, producing pellets of a size which will pass through a 10 mesh B. S. sieve and will be retained on an 80 mesh B. S. sieve.

In yet another aspect the invention consists in a method of distributing a hormone substance from an aircraft, said method comprising manufacturing pellets or the like of a size which will pass through a 10 mesh B. S. sieve and will be retained on an 80 mesh B. S. sieve, and in which the hormone substance in phytocidal proportion is intimately incorporated with a suitable carrier medium, and then distributing said pellets over the area to be treated from an aircraft.

The invention consists in these features and the features hereinafter described and more particularly pointed out in the claims.

I shall now describe preferred methods of carrying my invention into effect when the hormone substance or the like is incorporated with a suitable carrier medium in the form of a superphosphate with the result that each pellet forms the dual function of a fertilizer and a weed killer.

The weed killer which is preferably a hormone substance may be incorporated with the superphosphate in the manner disclosed in my co-pending application for Letters Patent Ser. No. 216,471 filed of even date herewith, now abandoned, the superphosphate being then so granulated as to provide pellets of the size hereinafter specified. Alternatively, however, such incorporation can be effected during the granulating process.

There are two main methods now in use for granulating superphosphate. In one method ordinary or concentrated standard superphosphate is put into a mixing device and water or other liquid added. This product is then fed into a rotary dryer which extracts the excess moisture and at the same time rolls the particles into little balls or pellets. In the other method the mixer is dispensed with and replaced by a rolling drum. The superphosphate is fed into the rolling drum and water is sprayed on to it. The particles and pellets then assume spherical shape and are then passed into a dryer as before.

For mixing a hormone substance with granulated superphosphate, the substance if soluble or in liquid form can be intimately mixed with the water or other liquid before it is applied to the standard phosphate. On the water or other liquid being mixed with or sprayed onto the superphosphate an intimate mixture of the hormone substance and the superphosphate is obtained.

Alternatively, such intimate mixture can be effected by the said hormone substance being added to the mixture of superphosphate and other fertilizing ingredients when same are being mixed together prior to granulation. Such addition can be effected by feeding the hormone substance or the like into the mixture in quantities proportionate to the superphosphate and other ingredients being granulated.

It is not unusual with granulating plants to incorporate other fertilizers so that each granulated pellet is a complete fertilizer in itself. Where the first method previously described is used, the additional fertilizers would be added at the mixing device and the hormone substance could also be added at this stage. When the second method described is used the other fertilizing ingredients are added by a suitable mixing arrangement before being fed into the rotary drum. The hormone substances would conveniently be likewise added at the same time that the other ingredients are mixed together before being fed into such drum.

It will be appreciated that by my said invention hormone substances or the like may be incorporated into the granulated superphosphate or superphosphate mixture during manufacture, and each granule or pellet is complete in itself i. e. contains superphosphate, hormone or the like and other desired fertilizing ingredients such as nitrogen or potash.

Particularly for aerial or the like distribution I have found that the granulated superphosphate having hormone or the like substances incorporated therein should be smaller in size than those usually marketed. The granules or pellets should all be retained on a 80 mesh B. S. sieve and should all pass through a 10 B. S. mesh sieve. This not only allows better distribution but increases the effectiveness of the hormone substance.

The manufacture of this fine granulated superphosphate containing hormone substance or the like for aerial distribution may be obtained by ordinary granulating plant as is herein described, or alternatively by using the "fines" from the granulating plant used in the manufacture of granulated superphosphate or mixtures, and regranulating the fines in a separate granulator where the hormone substance is added either to the water or other liquid used in the regranulating process or is added by being mixed with the granulated superphosphate fines (and other ingredient, if any) prior to regranulation.

The factors which would determine the size of the pellets made in the granulating process, such as minimum moisture content, temperature, the fineness of the mixture before granulation and the physical properties of the materials, would be known to any person skilled in the art. These factors are discussed in an article by John O. Hardesty and William H. Ross in "Industrial and Chemical Engineering" vol. 30, No. 6 (June 1938).

Precaution must be taken to ensure that the dryer temperatures are such that the hormone substances are not affected by excessive heat, and it is also recommended that the exhaust gases and dusts from the dryer are washed and neutralised in a suitable scrubber as a protection against 2,4-D or the like fumes or very fine dust particles being dispersed into the air at the place of manufacture.

It will be obvious from the foregoing that the invention is readily adapted for use with large granulating units not exclusively used for the manufacture of hormonized granulated superphosphate.

I shall now describe another aspect of my invention in which the pellet or the like comprises a suitable carrier medium which may or may not contain a fertilizer.

Suitable carrier mediums include clay, gypsum, lime, chalk, or the like which may or may not have fertilizing ingredients combined with them. Suitable binding agents may be used to prevent the granules from dusting and any known and suitable materials may be used if they do not materially adversely affect the hormone or like substances.

A suitable binding agent, if found necessary is a water soluble plastic such as methyl cellulose and this is added in solution with the water used in the granulation process.

I shall give by way of example one method of carrying the invention, in this aspect, into effect where clay is used as the suitable carrier medium. It will be obvious to anyone skilled in the art from this example how to prepare the granulated product or pellets with other suitable carrier mediums such as those hereinbefore mentioned.

To intimately incorporate clay with a hormone substance which in this example will be the sodium salts of 2,4-D, and assuming that aerial distribution is to be applied, 2 cwt. per acre would normally be a suitable application. The quantity of hormone substance would depend on the class of weed to be treated. Generally speaking 2 lbs. per acre of the sodium salts of 2,4-D would give a suitable proportion. Accordingly, in this example 20 lbs. of such salts would be added to every ton of clay to be formed into pellets.

The granulation of clay with the said sodium salts added follows well known principles similar to those used in the granulation of superphosphate. The clay is fed into a rotary granulating machine or drum in a finely divided dry form and water containing the correct amount of said salts is sprayed onto the clay, granulation occurring as already explained. Alternatively the said salts may be premixed with the clay in its finely divided form before being fed into the rolling drum as previously described in that method of granulating superphosphate by this method.

After granulation has occurred the granules are passed through a rotary dryer as previously described. In order to produce the maximum number of fine pellets the minimum quantity of water should be used. To some extent this will be determined by the physical properties of the clay and the initial water content. The percentage of water accordingly varies with actual working conditions, but 6 to 8 percent by weight is indicative.

Where in this specification and the appendant claims reference is made to granulation or granulating process such includes the drying step, if such is done independently of the actual granulating step.

I claim:

1. A solid herbicidal product adapted for aerial distribution consisting of granules comprising a carrier medium having intimately incorporated therein a phytocidal proportion of an organic hormone herbicidal substance, said granular product consisting of granules small enough to pass through a 10 mesh B. S. sieve and free of particles that will pass through an 80 mesh B. S. sieve.

2. A granular product as defined in claim 1, wherein the organic hormone herbicidal substance is a chlorinated aryloxy acetic acid compound.

3. A granular product as defined in claim 1, wherein the organic hormone herbicidal substance is selected from the group consisting of 2,4 dichloro phenoxy acetic acid, 2,4,5 trichloro phenoxy acetic acid and salts thereof.

4. A granular product as defined in claim 1, wherein the organic hormone herbicidal substance is the sodium salt of 2,4 dichloro phenoxy acetic acid.

5. A granular product as defined in claim 1, wherein the carrier medium is a solid calcareous substance selected from the group consisting of superphosphate, clay, gypsum, lime, chalk and mixtures thereof.

6. A granular product as defined in claim 1, wherein the carrier medium comprises a solid fertilizer substance.

7. A granular product as defined in claim 1, wherein the carrier medium comprises superphosphate.

8. The method of destroying undesirable foliage such as weeds and the like by evenly distributing controlled quantities of a herbicide over controlled ground areas upon which the growing foliage is to be destroyed, comprising intimately incorporating a phytocidal proportion of an organic hormone herbicidal substance into a solid carrier substance, converting the intimate mixture to granules, screening the granules to remove particles larger than 10 mesh and smaller than 80 mesh B. S. sieve size, whereby a dust-free granulate is produced sized to critical aerial deposition size, and then aerially distributing the granules over the specific land area to be treated in quantity sufficient to destroy the undesirable foliage growing thereon.

9. A solid herbicidal product adapted for aerial distribution, said product consisting of granules comprising a carrier medium having intimately incorporated in phytocidal proportion therein a herbicidal substance, said granular product consisting of granules small enough to pass entirely through a 10 mesh B. S. sieve and free of particles that will pass through an 80 mesh B. S. sieve.

10. A solid herbicidal product adapted for aerial distribution, said product consisting of granules comprising a fertilizer base as a carrier medium having intimately incorporated therein a phytocidal proportion of a herbicidal substance, said granular product consisting of granules small enough to pass through a 10 mesh B. S. sieve and free of particles that will pass through an 80 mesh B. S. sieve.

11. The method of applying a herbicide comprising distributing a herbicidal substance contained in phytocidal proportion in a carrier base of granules, said granules having a particle size small enough to pass a 10 mesh B. S. sieve and free of particles that will pass an 80 mesh B. S. sieve by scattering the same aerially from aircraft to fall upon the surface area of the land to be treated.

References Cited in the file of this patent

UNITED STATES PATENTS

| 1,947,971 | Cox | Feb. 20, 1934 |
| 1,991,325 | Heath | Feb. 12, 1935 |
| 2,061,567 | Facer | Nov. 24, 1936 |
| 2,091,993 | Jones | Sept. 7, 1937 |
| 2,453,983 | Sexton | Nov. 16, 1948 |
| 2,472,347 | Sexton | June 7, 1949 |
| 2,498,302 | Sexton | Feb. 21, 1950 |
| 2,655,445 | Todd | Oct. 13, 1953 |
| 2,695,839 | Kenney et al. | Nov. 30, 1954 |
| 2,695,840 | Leppla | Nov. 30, 1954 |

FOREIGN PATENTS

| 396,403 | France | Apr. 9, 1909 |
| 426,472 | Great Britain | Apr. 1, 1935 |

OTHER REFERENCES

"State Wide Conference (Forum) on Agricultural Usage of Aircraft," February 8–9, 1949, Minutes, page 26.

J. Amer. Society of Agronomy (1947), page 532.